Oct. 16, 1956 M. U. ZIMMERMAN, JR 2,767,066
IMPACT BAFFLE
Filed Aug. 17, 1953
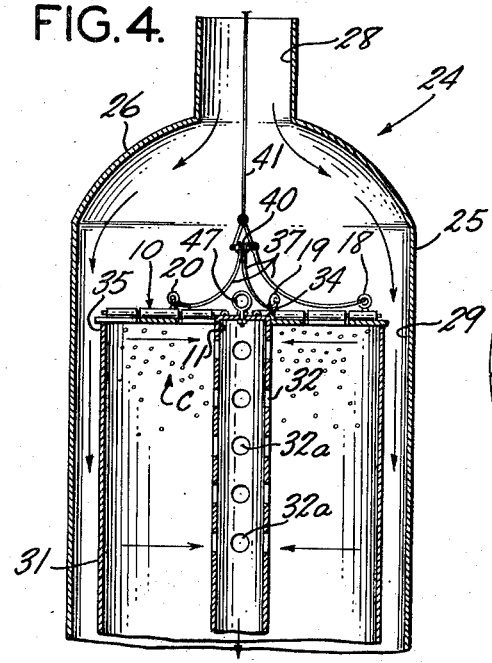
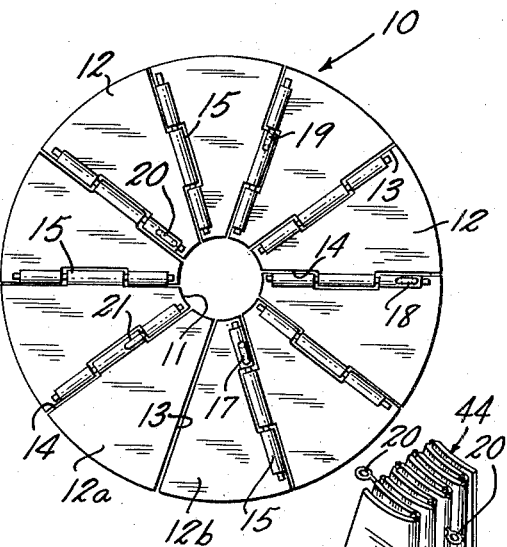
INVENTOR.
MARLIN U. ZIMMERMAN, JR
BY
Campbell, Brumbaugh, Free & Graves
his ATTORNEYS.

United States Patent Office 2,767,066
Patented Oct. 16, 1956

2,767,066

IMPACT BAFFLE

Marlin U. Zimmerman, Jr., Shaker Heights, Ohio, assignor to The Standard Oil Company, Cleveland, Ohio, a corporation of Ohio Application August 17, 1953, Serial No. 374,645

4 Claims. (Cl. 23—288)

This invention relates to a novel impact baffle construction, and more particularly it relates to a folding baffle which may be inserted and withdrawn through a relatively small opening and to a hydrocarbon reactor provided with such a baffle.

It is frequently a difficult and time consuming task to remove a baffle for cleaning or changing because of the restricted size of the access opening in the housing of industrial equipment. In a platformer reactor for example, used in chemical installations for the production of high octane fuels, a baffle is required to divert the bulk of the charged stock vapors to the side of the catalyst chamber. Due to the nature of this chemical process, the baffle must be removed at frequent intervals through a relatively small opening in the reactor housing in order to clean the baffle.

To facilitate this operation, it is the customary practice to utilize a layer of ceramic balls to divert the vapors. However, the disadvantage of this type baffle is the necessity of separating the balls from the spent catalyst, when the latter is removed from the chamber. In addition, it has been found impractical to use a conventional shield-type baffle for this purpose because it is necessarily too large to be withdrawn through the access opening in the housing. Furthermore, it has been found inconvenient to use a shield-type baffle formed of several smaller sections because of the difficulty of inserting each of the sections through a housing opening and then placing them in their proper positions, in respect to the catlyst chamber. Also, extra time is required to remove the individual sections from the housing.

The present invention is addressed to the problem of providing a baffle of uncomplicated and inexpensive design which can readily be inserted through a relatively small opening, conveniently placed in the desired position, and easily withdrawn.

In accordance with the invention, a baffle is provided that is formed of a plurality of hinged sections. Grappling hooks or rings, which are secured to the sections, are arranged so that when the baffle is lifted thereby, the sections of the baffle will fold in accordion fashion and as a result may be conveniently withdrawn or inserted through a relatively small opening.

For a better understanding of the present invention reference may be had to the accompanying drawings in which:

Figure 1 is a plan view of the new type baffle showing the arrangement of the individual sections thereof and also the disposition of the grappling rings;

Figure 2 is a perspective view of the new type baffle partially folded in accordion fashion;

Figure 3 is a schematic perspective view of the baffle in a completely folded position; and Figure 4 is a view in longitudinal section of the upper portion of a platformer reactor showing the location of the baffle therein.

Figures 1, 2 and 3 disclose one form of this new baffle construction wherein an annular shaped baffle 10, having an opening 11 in the center thereof, is formed of ten pie-shaped segments 12. Each of the segments 12, which are formed of thin steel, aluminum or other types of relatively strong, non-corrosive sheet material, have radially extending sides 13 and 14. The sides 13 and 14 are hinged by suitable hinging means indicated at 15, to the corresponding sides of adjacent segments, except for sides 13 and 14 of the segments 12a and 12b, respectively.

Grappling rings 17, 18, 19, 20 and 21 are secured by suitable means such as welding near alternate hinged junctions 15 between the adjacent sides 12a and 12b of the segments 12. Also, it will be noted that the rings 17, 18, 19, 20 and 21 are disposed in a staggered relationship, along the radially extending sides of the segments 12 in respect to the center opening 11 of the baffle 10. When the baffle 10 is raised by suitable means connected with the rings 17, 18, 19, 20 and 21, the segments 12 fold in accordion fashion as shown in Figure 3. In this connection, it will be appreciated that if all of the segments were hinged, the baffle could not be as compactly folded. Also it will be seen that the purpose of disposing the rings in a staggered relationship is to prevent them from interfering with one another when the baffle 10 is completely folded. Also for this purpose the rings 17, 18, 19, 20 and 21 may be positioned alternately near the middle and the upper or inner edges of the baffle segments 12.

It will be understood, of course, that the baffle may be constructed with a greater or lesser number of segments and that the segments may be of different shapes. For example, the baffle may be formed of a plurality of parallel and generally rectangular hinged sections rather than pie-shaped segments described above. In all modifications, however, the grappling rings are disposed in staggered relationship so that they will not interfere with one another when the baffle is folded.

With reference to Figure 4, a platformer reactor 24 shown therein, includes a vertically disposed cylindrical housing 25 having an inverted funnel shaped end closure 26 formed at the upper end thereof. It will be seen that the opening 28 in the end closure 26 is of substantially smaller diameter than the inner diameter 29 of the housing 25.

A cylindrically shaped catalyst screen 31 is concentrically disposed within the reactor housing 25. A perforated pipe 32, having many small openings 32a along its side, is vertically disposed within the catalyst screen 31 in axial alignment with the end closure opening 28. The upper end 34 of the pipe 32, which is closed, extends slightly beyond a plane described by the upper open end 35 of the catalyst screen 31.

An annular shaped baffle 10, constructed in accordance with this invention, is horizontally supported upon the upper end 35 of the catalyst screen 31. The closed upper end 34 of the pipe 32 extends through the center opening 11 of the baffle 10 a slight distance. It will be noted that the outer diameter of the extended baffle 10 is substantially greater than the diameter of the opening 28 in the end closure 26, and thus cannot be removed therethrough when in its extended position.

When the charged stock vapors indicated by the arrows in Figure 4, are admitted through the opening 28 in the housing end closure 26, the vapors, instead of immediately coming in contact with catalyst C in the catalyst screen 31, are diverted by the baffle 10. As a result, the vapors flow downwardly about the side of the cylindrical catalyst screen 31 within the reactor housing 25. By means of suitable openings formed in the side of the catalyst screen 31, the vapors are permitted to seep through the catalyst C, and thereafter enter the perforated pipe 32 and flow out of the reactor 10.

In the form of the invention shown in Figure 4, wires 37 are connected to the grappling rings 18, 19, 20 and 21, respectively. The opposite ends of the wires 37 are attached to a connecting ring 40 which in turn, is connected to a cable 41 extending upwardly through the housing opening 28.

Thus, it will be seen that when the cable 41 is raised, the hinged segments 12 of the baffle associated with the connecting wires 37, are raised, and the baffle 10 is thereby folded in accordion fashion. In this connection, it will be noted that the upwardly facing end 44 of the folded baffle 10 as shown in Figures 2 and 3, is of smaller dimension than the opposite end 45. The end 44 is the first to be withdrawn through the opening 28 in the end closure 26, because one or more of the wires 37 are connected to grappling rings 20 positioned near the upper end 44 of the baffle 10. This feature facilitates the removal of the baffle 10 from the housing 25.

It will be appreciated that other types of connecting means may be used to remove the baffle 10 from the reactor housing 25 and they may not necessarily be permanently connected to the grappling rings. Also in this connection, a hook or loop 47 may be secured by suitable means to the upper end 34 of the perforated pipe 32 in order to facilitate the removal of the pipe 32 through the opening 28 in the housing end closure 26.

It will be understood that this new folding baffle is described in connection with a platformer reactor only as one specific illustration of its many applications. Also, it will be understood that the various structural parts of the baffle are susceptible to considerable modifications. Furthermore, the baffle itself may be formed in different shapes, as for example, rectangular or hexagonal, and with or without a center opening. Therefore the form of the invention described above should be considered as illustrative and not as limiting the scope of the following claims.

I claim:

1. A hydrocarbon reactor comprising a substantially cylindrical housing having an opening of reduced diameter at one thereof for entry of a gaseous reactant, a catalyst chamber of lesser diameter than the housing disposed substantially concentrically within the housing and in axial alignment with said opening, a collapsible baffle covering one end of the catalyst chamber for diverting the entering gaseous reactant to the side of the catalyst chamber, said baffle comprising a plurality of hinged sections and hooking means connected in staggered relationship with alternate sections and being removable, in collapsed condition, through said opening, and means within the catalyst chamber for inducing a flow of the gaseous reactant and the reaction products thereof radially into and through the catalyst chamber.

2. A folding baffle comprising a plurality of approximately symmetrical and generally triangular shaped segments arranged so that two sides of each of said segments extend radially from the center of said baffle, hinging means pivotally connecting all but one pair of the adjacent radially extending sides of said segments, hooking means attached to alternate segments and disposed symmetrically on said segments but with adjacent hooking means located at unequal distances from the center of said baffle, and a plurality of collapsible tension-bearing members having one end of each of said members attached to one of said hooking means, and having the other end of each of said members connected to a common pulling means, said tension-bearing members being of unequal lengths whereby a force exerted upwardly on said common pulling means when the baffle is in a spread-out position will cause said segments to fold in accordion fashion and permit said baffle to be withdrawn or inserted through a relatively small opening.

3. A baffle as described in claim 2 wherein said hooking means are attached to alternate hinging means.

4. A baffle as described in claim 2 having a circular opening in the center thereof and wherein said segments are radially disposed about said opening.

References Cited in the file of this patent

UNITED STATES PATENTS

| 1,953,938 | Jaeger | Apr. 10, 1934 |
| 2,319,620 | Mather | May 18, 1943 |
| 2,576,905 | Labus | Nov. 27, 1951 |